June 13, 1961 C. A. VAN PAPPELENDAM 2,988,128
METHOD OF FABRICATING STRUCTURAL SANDWICHES
Original Filed Sept. 23, 1957 3 Sheets-Sheet 1
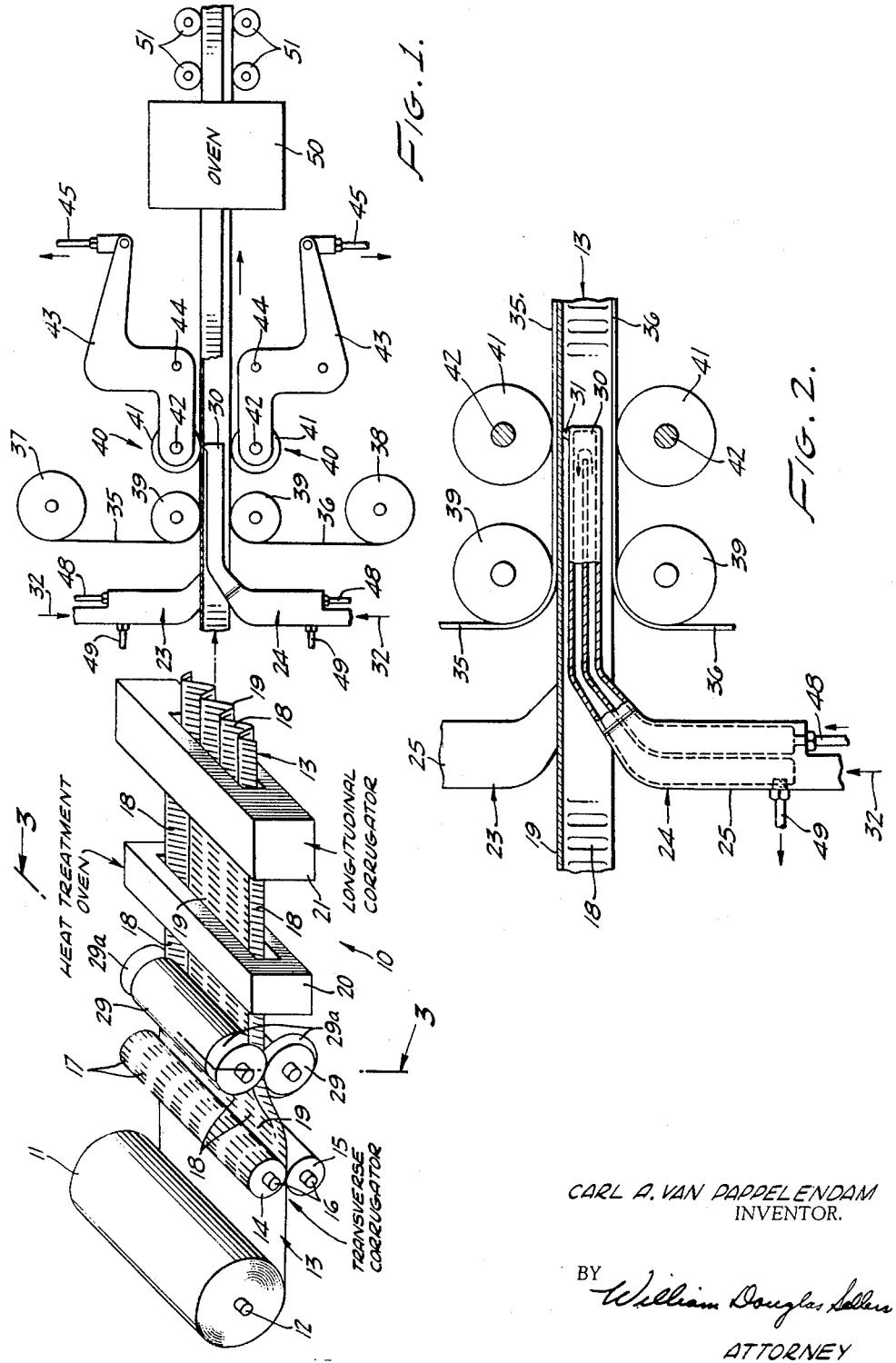
CARL A. VAN PAPPELENDAM
INVENTOR.
BY William Douglas Sellers
ATTORNEY June 13, 1961 C. A. VAN PAPPELENDAM 2,988,128
METHOD OF FABRICATING STRUCTURAL SANDWICHES
Original Filed Sept. 23, 1957 3 Sheets-Sheet 2
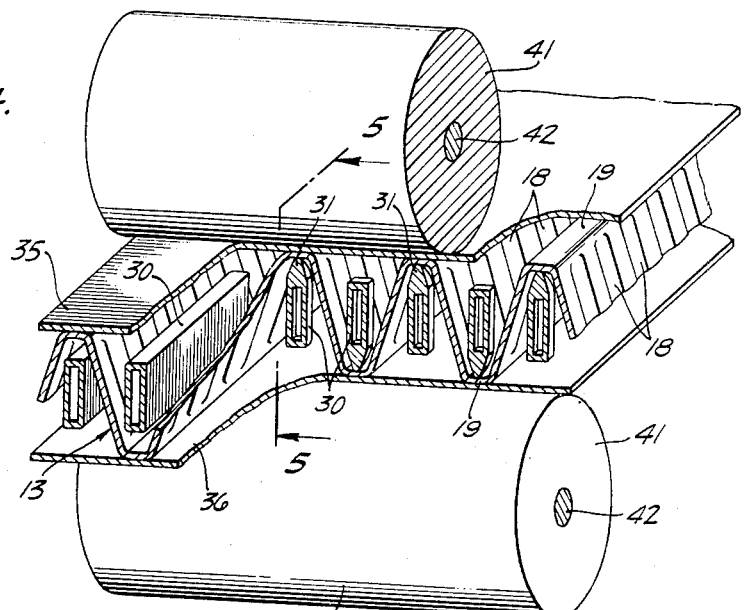
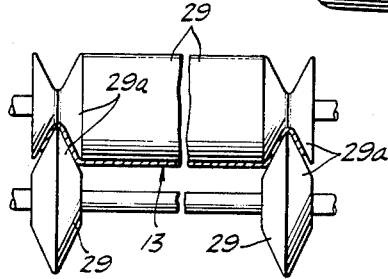
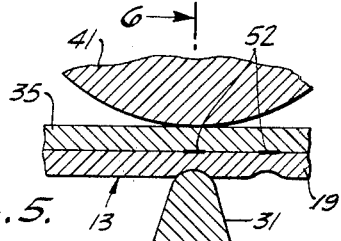
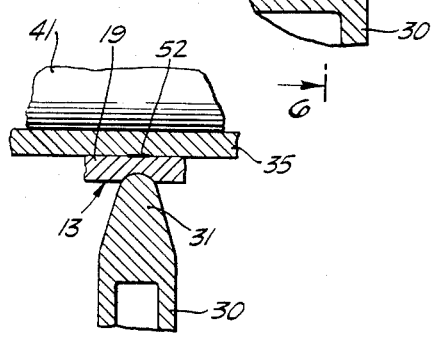
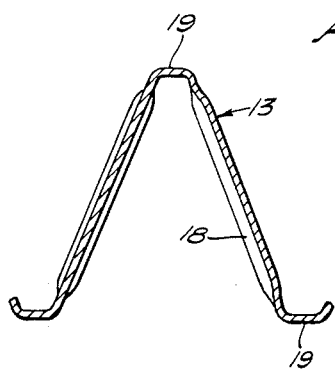
CARL A. VAN PAPPELENDAM
INVENTOR.
BY William Douglas Sellers
ATTORNEY June 13, 1961  C. A. VAN PAPPELENDAM  2,988,128
METHOD OF FABRICATING STRUCTURAL SANDWICHES
Original Filed Sept. 23, 1957  3 Sheets-Sheet 3
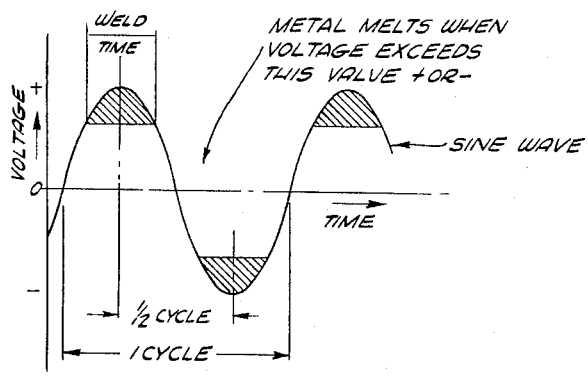
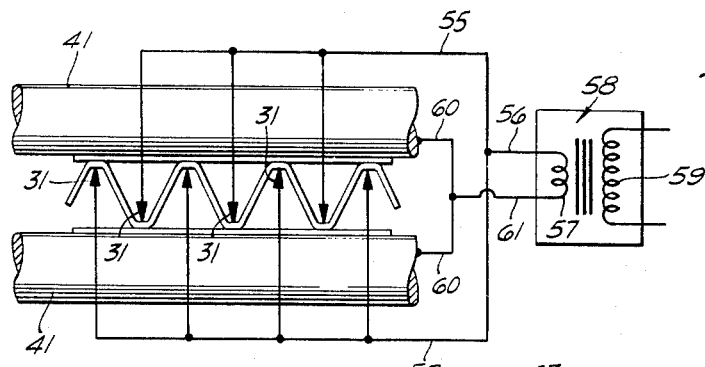
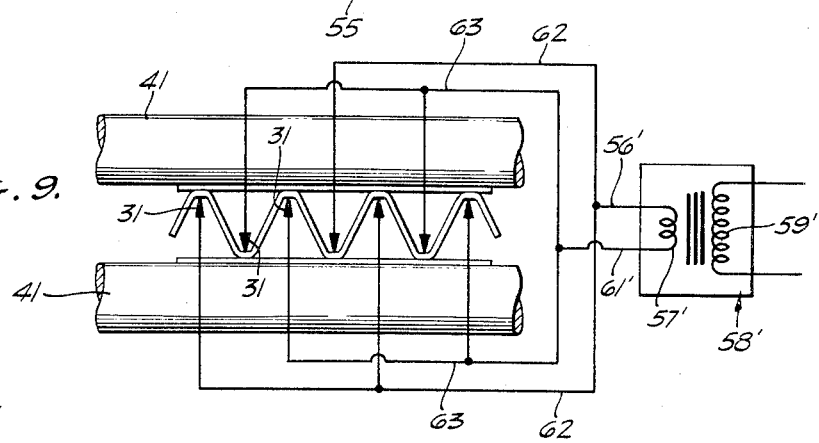
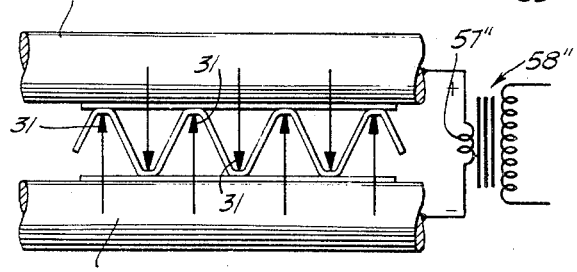
CARL A. VAN PAPPELENDAM
INVENTOR.
BY William Douglas Sellers
ATTORNEY

United States Patent Office 2,988,128
Patented June 13, 1961

2,988,128
METHOD OF FABRICATING STRUCTURAL SANDWICHES
Carl A. Van Pappelendam, 8260 Samoline Ave., Rivera, Calif.
Original application Sept. 23, 1957, Ser. No. 685,740. Divided and this application Feb. 11, 1958, Ser. No. 714,563
9 Claims. (Cl. 153—77)

The present invention relates to structural sandwiches and more particularly to an improved method of fabricating such sandwiches continuously from sheet metal utilizing new welding techniques for stitching the longitudinally corrugated core sheet to outer face sheets by rows of closely spaced spot weld.

This application is a division of my co-pending application for United States Letters Patent Serial No. 685,740 filed September 23, 1957, now Patent No. 2,866,075, for Method of Fabricating Structural Sandwiches.

Laminated sandwich structures as heretofore provided have been formed from non-metallic materials and certain constructions have enjoyed wide spread use, as for example, corrugated paper sheeting of the type used in making shipping containers. The commercial success of such sheeting is due in large measure to high-strength fast-setting adhesives resistant to moisture and to the rapid and economic methods developed for manufacturing the sheeting in continuous lengths. Although these high-speed manufacturing techniques have been in wide scale use for many years, attempts to apply the skill of this art to the manufacture of cellular metal, though tried, have been fruitless owing to the many problems involved in trying to substitute metal for fibrous and non-metallic sheeting materials generally. To be commercially acceptable, a method of bonding the laminae together must be carried out speedily, at low cost, within very close quarters, and produce a uniform joint as strong as the sheet material and without weakening or disfiguring the material. Further, the joint must withstand mechanical and thermal shock, be unaffected by moisture or heat and be suitable for assembly from very thin sheets of metal.

Prior attempts to employ electric welding bonding techniques have been beset by many vexatious problems which seemingly were insurmountable with respect to the welding of cellular structures of one-half inch or less in thickness. Experience has shown that the opstacles to success increase sharply as the thickness of the finished product decreases below one-half inch. These obstacles have included such serious ones as mounting suitable electrodes within continuously advancing cellular structures, obtaining the required welding pressure between the electrodes, cooling the electrodes, controlling the welding current to obtain uniform high-strength welds without damaging adjacent areas of the sheeting, preventing buckling, warping, and distortion of the sheet material, holding the sheets of material and electrodes properly spaces, and maintaining all sheets properly and uniformly stressed during welding to the end that all areas of all components will be substantially uniformly stressed and capable of sustaining a load equitably. Desirably for high-speed welding, the welding pressure between electrode pairs can be of the order of 15 thousand pounds per square inch or higher and the problem of providing such pressures within corrugated core sheets of shallow dimensions was found to have its discouraging aspects. No less serious was the problem of handling the required high current flows and the application of these to the product being fabricated.

The foregoing and other problems are successfully solved by the present invention in the manner outlined generally in the aforementioned co-pending application and as beneficially supplemented in numerous additional respects to be disclosed hereinbelow. In brief, the improved method of making lightweight cellular sandwiches from high-density material prestiffened against buckling and adapted to be mass-produced continuously in sheets of any length comprises feeding a core sheet through both transverse and longitudinal corrugating operations, a first heat treating operation, a welding operation and then through a final heat treating operation. The welding operation is especially important and, preferably is one in which closely spaced spot welds are formed automatically to stitch-fuse the face sheets to the longitudinal crests of the core sheet corrugations. The spacing of the stitches or spot welds is a function of the frequency of the alternator current power supply or of the intermittent or non-uniform nature of a direct current power supply and of the rate of feed past the electrodes. Preferably, but not necessarily, a greater pressure is applied to the outer electrodes than is used against the opposing inner electrodes in order to utilize advantageously the supporting strength of the core sheet as well as to use the inner electrodes to support the core sheet from pressures applied outwardly through the bottom of the longitudinal corrugations.

Accordingly, it is a primary object of the invention to provide an improved method of fabricating a cellular sandwich from thin sheet metal.

Another object is the provision of an improved method of continuously and automatically welding thin metal sheets together to form a high-strength cellular sandwich.

Another object is the provision of an improved method of economically mass-producing continuous high-density material into lightweight cellular sandwiches prestiffened against buckling and possessing great strength, bending stiffness and high heat insulating characteristics.

Another object of the invention is the provision of a method of welding a corrugated core sheet to exterior face sheets while holding the corrugated core sheet tensioned lengthwise thereof.

Another object of the invention is the improved method of welding corrugated core sheets to face sheets as such sheets are advanced under tension, and including utilization of such tension in cooperation with high pressure applied to internal electrodes seated against the bottoms of the corrugations to hold the electrodes against lateral displacement by flux field forces.

Still another object of the invention is the provision of a method for making a continuous cellular sandwich material from metal employing a transversely and longitudinally corrugated core sheet welded to opposed facing sheets and wherein the core sheet is heat treated before being welded to the face sheets and wherein the complete assembly is heat treated while under longitudinal tension.

Another object of the invention is the provision of an improved method of forming corrugated metal sheets from continuous strip stock and featuring a control and guide channel along the lateral edges thereof.

These and other more specific objects will appear upon reading the following specification and claims and upon considering in connection therewith the attached drawings to which they relate.

Referring now to the drawings in which a preferred embodiment of the invention is illustrated:

FIGURE 1 is a diagrammatic view partially in perspective and partially in side elevation illustrating generally the consecutively performed processing operations constituting the present method for fabricating structural sandwich material;

FIGURE 2 is a fragmentary side elevational view on an enlarged scale showing the welding operation;

FIGURE 3 is a vertical sectional view taken on line 3—3 of FIGURE 1;

FIGURE 4 is a fragmentary view in perspective on an enlarged scale showing the forward end of the internal electrodes in relation to the corrugated core sheet;

FIGURE 5 is a fragmentary sectional view on a greatly enlarged scale taken on line 5—5 of FIGURE 4;

FIGURE 6 is a cross-sectional view taken on line 6—6 of FIGURE 5;

FIGURE 7 shows the sinusoidal voltage wave of the alternating current employed to energize the welding electrodes;

FIGURE 8 is a schematic diagram showing one way in which the electrodes may be energized;

FIGURE 9 is a similar schematic diagram of a second mode of energizing the welding electrodes;

FIGURE 10 is a schematic diagram of a third mode of energizing the welding electrodes; and FIGURE 11 is a fragmentary transverse sectional view on an enlarged scale through a single one of the longitudinal corrugations.

While the present invention is susceptible of being carried out by hand utilizing a source of welding current, economical mass-production considerations make it desirable to utilize simple apparatus suitably arranged to perform the several manipulative steps sequentially. Accordingly, a typical arrangement of the essential apparatus found useful for these purposes is illustrated schematically in FIGURE 1 and designated generally 10. Owing to the fact that the central or core sheet of the sandwich structure is gathered crosswise thereof into longitudinal corrugations, it is essential that the supply roll 11 of flat sheet metal stock for this core be considerably wider than the width of the fabricated sandwich. Supply roll 11 is supported on a mandrel 12 and the sheet metal 13 issuing therefrom passes through a pair of complementarily shaped corrugating rolls 14 and 15 mounted on mandrels 16 and are suitably pressed together to corrugate sheet 13 transversely thereof. For this purpose each of rolls 14 and 15 is provided with axially spaced rows of shallow corrugating shapes 17 cooperating to form laterally spaced rows 18 of shallow corrugations separated from one another by flat non-corrugated strips 19. It will be understood that individual ones of the corrugations making up rows 18 have their ends gradually merging with the flat strips 19 and that the depth of the individual corrugations being as deep as space and other factors permit and may be, for example, one-eighth of the final core height or the distance between the face sheets. In thin sandwich structures the size of the inner electrodes is a limiting factor on the depth of the transverse corrugations.

Preferably sheet 13 passes between a pair of rollers 29, 29 having a pair of mating flanges and grooves 29a at their opposite ends so positioned as to form the outer ones of the longitudinal corrugations 18 prior to the formation of the intermediate ones of these corrugations. As is clearly shown in FIGURES 1, 3 and 4 the outer longitudinal corrugations include an outer partial side wall which is of very considerable importance in the subsequent processing of the sheet and of the cellular structure. For example, the trough so provided aids in controlling the feed of core sheet through the following steps and permits the sheet to be gripped and firmly held while the remaining longitudinal corrugations are being formed. Additionally and importantly, the partial corrugation or lip serves to hold the first and last ones of the inner electrodes accurately positioned for the welding operation as will be understood by reference to FIGURES 4, 8, 9 and 10.

Sheet 13, after passage through corrugating rollers 14 and 15, passes through a heat treatment oven 20 and then into a suitable longitudinal corrugator 21 which is effective to gather sheet 13 crosswise thereof to form all except the two outer longitudinal corrugations the crests of individual ones of which are formed by the non-corrugated flat strips 19 between transverse corrugations 18. Stated differently, individual corrugations have their side walls formed by a pair of adjacent strips of transverse corrugations 18 and the intervening crest formed by the narrow non-corrugated strip 19. From the foregoing it will be apparent that the core sheet 13 issuing from the longitudinal corrugator 21 is processed in readiness for assembly in a continuous manner between a pair of flat facing sheets, such continuous assembly including both advance from station to station either in a continuous or intermittent manner.

Before describing the mode of assembling the sandwich structure, it is desired to refer briefly to the materials used, their relative dimensions and certain other details of consequence. It will be understood that metals of various kinds and types may be employed and particularly those having high tensile strength, good working characteristics, resistance to corrosion and attack by gases and liquids, good heat insulating qualities and which are readily joined by electric welding. Although various metals meet these characteristics, stainless steel is particularly suitable and the particular values hereinafter stated are applicable when employing this material in very thin sheets to fabricate sandwich structures. In using the herein disclosed technique for making sandwich structures for application in aircraft and guided missiles and other structures of this nature, the desired finished product may have a cross-sectional thickness in the range of $5/32$ to $3/16$ inch. However, it will be understood that the method can be utilized in making similar structures of either greater or lesser thickness. In a sandwich structure of approximately $5/32$ inch thickness using stainless steel sheeting, the core sheet preferably has a thickness of approximately 2 mils and the face sheets each have a thickness of approximately 6 mils. It is found that a structure made from type 301 stainless steel sheets of the described thickness is equivalent in weight to 17 mil thick solid sheet material, but has a bending stiffness as much as 235 times greater.

With the foregoing dimensions of the sheet stock in mind, the manner in which the face sheets are brought into assembly relation to the core sheet and then welded thereto by a continuous technique at either a uniform or non-uniform rate and forming an important aspect of the present invention will be disclosed. Although welding pressure requirements vary widely depending on many factors well known to persons skilled in this art, good results have been claimed using pressures of the order of magnitude of 30,000 pounds per square inch, this pressure being applied across the joint to be made between the crests of the longitudinal corrugations and the juxtaposed face sheets. The manner in which such pressures are generated interiorly of the corrugations by means of electrodes carrying the very high welding current will be described by reference to FIGURES 1 to 6. Referring first to FIGURE 2, it will be seen that the identical inner welding electrodes 23, 24 comprise hollow L-shaped members arranged alternately in two rows transversely of the core sheet with their shorter legs 25 projecting in opposite directions from the opposite sides of the core sheet, these legs being supported in such manner that a desired outwardly outwardly acting pressure cna be applied to the bottoms of the longitudinal corrugations. The long narrow horizontally disposed legs 30 of the electrodes extend parallel to one another. Projecting from the ends of legs 30 in a direction opposite to supporting legs 25 is a welding tip 31, the ends of which are accurately ground to the same size and which tips support the core sheet in a horizontal plane by pressure applied to the bottom of each corrugation 18. The area of the tips as used in making a $5/32$ inch sandwich of the above described sheets of stainless steel was 0.000176 square inch.

The ends of electrode legs 25 connect with means (not shown) for applying known loads to the welding tips 31, such loads acting in opposite directions on adjacent electrodes as is indicated by the arrows 32. Accordingly, the applied load acts to force the welding tips 31 against the interior bottom portions of the corrugation with the result that the crests of adjacent corrugations are supported in spaced parallel planes. It follows that the core sheet is supported horizontally with the side wall portions of the corrugations held taut and uniformly spaced transversely of the core sheet.

The exterior face sheets 35 and 36 are supplied from continuous rolls 37 and 38, the webs from these rolls being pressed against the opposite sides of core sheet 13 by means of guide rolls 39 suitably supported opposite one another at a point slightly upstream of welding electrode 40. The exterior welding electrodes generally indicated at 40 may comprise separate, individually loaded and positioned electrodes for each weld row. As here shown by way of illustration, the external electrodes may be of any suitable construction, as for example, one upper and one lower metal roller 41 mounted on shafts 42 having their ends journaled in L-shaped supporting brackets 43 suitably supported as by trunnions 44. Linkages 45 for upper roller are attached to a fixed point and for lower roller to counterweights or other adjustable means for pressing the electrode rollers 41 against the outer surfaces of face plates 35 and 36 at points directly opposite welding tips 31 of the interior electrodes. By adjusting tension in lower linkages 45 a desired pressure can be applied to the opposite sides of the sandwich structure found most effective in electrically fusing the contacting faces of the core sheet and face sheets together. By adjusting upper linkages 45 correct vertical location of rollers can be obtained.

As stated above, it is important to maintain the face sheets in firm contact with the crests of the longitudinal corrugations in a plane transversely of the direction of travel during the welding operation. The pressure applied to the outer electrodes may vary from that barely producing contact of the face sheets with the core crests to that almost crushing the core without materially affecting the pressure applied at tips 31 of inner electrodes 23, 24. This wide range tolerance characteristic of the electrode loading system is of great importance in allowing for minor variations in the core height.

A desired high welding pressure between the abutting faces of the corrugations and of the face sheets of 125,000 p.s.i. or more is attainable despite the small working quarters provided interiorly of individual corrugations of the sandwich structure by reason of the minute area of welding tips 31 in contact with the bottoms of the corrugations. It is pointed out that the desired welding pressures vary in accordance with such factors as the kind of material, its thickness, surface finish, and others. When welding very thin bright finished stainless steel, a pressure of 30,000 p.s.i. is found to give good results.

The very high welding current employed in the welding operation makes it desirable if not mandatory to cool the electrodes. A blast of cooling air applied across the relatively large exterior electrodes is quite adequate but it is desirable to cool the inner electrodes 23, 24 by circulating cooling water through their hollow interiors. Cooling water may be supplied to the latter through conduit 48, this conduit preferably extending through the hollow vertical legs and discharging forwardly into the horizontal legs 30. The heated water is withdrawn from the electrodes through a conduit 49 communicating with the interior close to the ends of the vertical legs as is indicated in FIGURE 2.

Suitable means for advancing the sandwich structure through the various operations and past the welding station is provided, the finished structure being advanced under tension through the final heat treating oven 50 and between sets of drive rollers 51 serving additionally to hold the structure flat until it has cooled.

Reference will now be had to FIGURES 7, 8, 9 and 10 illustrating features of the important electric welding equipment and the different modes in which the welding current can be connected to the inner and outer electrodes. An important feature of the invention is the use of alternating current as the power supply for the electrodes in order that the changing voltage may be availed of to control time duration of current flow once a fusing temperature of the metal has been reached. Certain economies are available when using alternating power supply and for this reason as well as the simplicity of the illustration, different advantageous modes of using this type of power supply will be described. Other feasible power supplies include controlled pulse type of current provided by conventional welders of this type and direct current used to form either a continuous seam or a row of spot welds depending on the speed of advance of the material and other factors well known to persons skilled in this art.

Referring to FIGURE 7 there is shown graphically by way of example a 60 cycle sinusoidal alternating current having a peak voltage of about 1 volt and a peak current of about 200 amperes. Note that the crests of the waves are shaded to indicate that when the voltage reaches a value in the vicinity of 75% of peak voltage, sufficient current is flowing through the high pressure area of contact between welding tips 31 of the inner electrodes and the point of contact of the outer electrodes with the face sheets to fuse the contacting areas together over a small spot area indicated at 52 in FIGURES 5 and 6. This fusing temperature, together with the high pressures ranging between 25,000 and 125,000 p.s.i. forms a very strong but small area weld of the size indicated at 52 in FIGURES 5 and 6. Before the surroundng area of the contacting sheets can heat to fusing temperature, the voltage crest has receded and there is an insufficient current flow to fuse the metal, it being borne in mind that the sandwich is moving either steadily or intermittently past the electrodes. The foregoing factors account for the fact that a series of very small dots or elliptically shaped welds 52 are formed along the crests of the longitudinal corrugations the distance between welds 52 being dependent on the speed of advance of the sandwich structure and the welding frequency. Sixty cycle power supply yields 7200 welds per minute. Accordingly, the welds can be located very close together or apart several times the diameters of individual welds depending upon the rate at which the sandwich structure is pulled past the welding electrodes.

The power supply may be connected to the electrodes in various ways but preferably in accordance with the principles of one of the three methods represented in FIGURES 8 to 10, it being understood that either single or multi-phase power supply may be used, or in the alternative, various types of current power supplies. Since single phase is simpler to illustrate it has been used in each of the three schematic circuits but certain economies and advantages can be gained by use of a three phase power supply. Accordingly, the latter is to be understood as coming within the scope of the present invention. In the FIGURE 8 circuit, the inner electrodes are connected by suitable heavy duty buses 55, 55 to one side 56 of the secondary 57 of a heavy duty step down transformer 58 having its primary coil 59 connected to a 60 cycle power supply. The outer or roller electrodes 41 are connected in parallel by heavy buses 60 connected through bus 61 with the other side of transformer secondary 57.

In FIGURE 9 a second mode of connecting the inner and outer electrodes is shown, it being noted that outer electrodes 41 have no direct connection with the power supply. Instead, the opposite sides 56', 61' of the transformer secondary 57' are connected to buses 62, 63 respectively. Note that the arrangement is such that the opposite sides of secondary 57' are connected to alternate ones of the downwardly facing welding tips 31 and that the opposite sides of secondary 57′ are connected to alternate ones of the upwardly facing welding tips 31.

In FIGURE 10 the opposite ends of secondary 57″ are connected to outer electrodes 41, 41 mounted directly opposite one another on opposite sides of the sandwich structure. To be noted in particular is the fact that the current does not flow directly from the transformer secondary to the welding tips 31; instead the current flows between the outer electrodes by way of the metal sandwich structure. In this connection it will be apparent that the high pressures of 25,000 to 125,000 p.s.i. applied between the adjacent inner and outer electrodes is effective to confine the current flow largely to the high pressure contact areas, thereby causing the metal opposite these points to fuse and weld together.

Although no schematic diagrams have been given for use of other power supplies, it is to be understood that this can be done within the skill of the art modified as may be necessary to incorporate the principles outlined above in describing an alternating current power supply.

Summarizing, it has been found of extreme importance to weld both face sheets to the crests of the core sheet simultaneously and along transverse lines lying within substantially the same vertical plane extending crosswise of the direction of sandwich travel. Of importance too is the performance of the welding operation while the sandwich is held flat transversely thereof and under longitudinal tension. When the component sheets are welded together in this manner, it is found that the resulting product has a minimum tendency to buckle, warp and distort from the flat prewelded condition of these components. Furthermore, when so welded any internal stresses in the product are substantially balanced and easily removed in a stress relieving oven, particularly if this latter operation is carried out immediately following the welding operation and while the structure is rigidly supported in a flat plane under tension.

While the particular method of making electrically welded sheet metal sandwich structure herein shown and disclosed in detail is fully capable of attaining the objects and providing the advantages hereinabove stated, it is to be understood that they are merely illustrative of the presently preferred embodiments of the invention and that no limitations are intended to the details of construction or design herein shown other than as defined in the appended claims.

I claim:

1. That improvement in the manufacture of cellular sandwich structures from flat sheet metal which comprises forming a plurality of closely spaced rows of shallow corrugations in a thin core sheet of metal, the rows extending lengthwise of the sheet with the longitudinal axis of said shallow corrugations extending transversely of said sheet, forming a single longitudinal corrugation along each lateral edge and thereafter corrugating the remainder of the sheet in such manner that the flat strip between said rows of shallow corrugations form the crests of the longitudinal corrugations.

2. That improvement in the manufacture of corrugated core sheet material for use in the manufacture of cellular sandwiches which comprises passing thin strip metal through an initial forming operation to provide a plurality of closely spaced rows of shallow corrugations, said rows extending lengthwise of said strip with the longitudinal axes of said corrugations extending transversely of said strip, and forming at least one corrugation longitudinally along each lateral edge of said strip before forming intermediate corrugations lengthwise of the strip for use as guide and control grooves to facilitate the handling and longitudinal corrugating of remaining portions of said strip.

3. That improvement defined in claim 2 characterized in that the juxtaposed ends of said rows of shallow corrugations are so formed as to lie closely spaced from one another leaving a narrow strip of flat sheet material therebetween.

4. That improvement defined in claim 2 characterized in that said corrugations extending lengthwise of said thin metal strip each have a crest formed to lie closely adjacent the ends of a different row of the shallow corrugations.

5. That improvement in the manufacture of continuous planar core sheets for use in the fabrication of cellular sandwich material which improvement comprises advancing a continuous flat thin strip of metal from a supply roll through an initial shaping station and there forming longitudinal rows of shallow corrugations with their longer axes extending crosswise of the advancing strip and with the ends of the corrugations in each row arranged in straight parallel alignment longitudinally of the strip and closely spaced from the juxtaposed ends of the corrugations in the adjacent row, and simultaneously forming a relatively deep continuous guide and control corrugation longitudinally of the strip closely adjacent each lateral edge with the open side of each corrugation lying generally parallel to said thin strip of metal while maintaining the advancing corrugated portions of said strip flat for subsequent bonding between face sheets of cellular sandwich material.

6. That improvement defined in claim 5 characterized that in the step of so forming said guide and control corrugations the interior adjacent side walls thereof are formed from a row of said shallow transverse corrugations with one end of said shallow corrugations terminating immediately adjacent the associated crest of said relatively deep corrugations whereby said shallow corrugations serve to stiffen and reinforce said longitudinal corrugations.

7. That improvement defined in claim 5 characterized in the further step of forming the remainder of said strip into relatively deep parallel corrugations each having diverging side walls having a row of said shallow corrugations extending crosswise of said walls and serving to reinforce the same.

8. That improvement defined in claim 5 characterized in the further step of corrugating the portion of said strip between said longitudinal corrugations to form similar deep corrugations parallel to one another and having diverging side walls each having a row of shallow corrugations extending crosswise thereof between the crests of adjacent longitudinal corrugations.

9. That improvement defined in claim 5 characterized in the further step of constraining the crests of the deep longitudinal corrugations on the opposite sides of said strip to lie in parallel planes passing through the narrow flat strips of said sheet lying between said rows of shallow corrugations.

References Cited in the file of this patent

UNITED STATES PATENTS

| | | |
|---|---|---|
| 969,460 | Chartener | Sept. 6, 1910 |
| 1,890,077 | Elting | Dec. 6, 1932 |
| 1,905,398 | Schnell | Apr. 25, 1933 |
| 2,160,677 | Romanoff | May 30, 1939 |
| 2,165,282 | Loggins | July 11, 1939 |
| 2,505,241 | Gray et al. | Apr. 25, 1950 |
| 2,811,989 | Henderson | Nov. 5, 1957 |

FOREIGN PATENTS

| | | |
|---|---|---|
| 940,240 | France | May 10, 1948 |